(12) United States Patent
Hoppe et al.

(10) Patent No.: US 10,781,862 B2
(45) Date of Patent: Sep. 22, 2020

(54) COMPENSATING COUPLING

(71) Applicant: Schaeffler Technologies AG & Co. KG, Herzogenaurach (DE)

(72) Inventors: Jens Hoppe, Erlangen (DE); Radu Cosgarea, Brasov (RO); Friedrich Schuler, Wilhelmsdorf (DE); Christian Dörner, Sugenheim (DE)

(73) Assignee: Schaeffler Technologies AG Co. KG, Herzogenaurach (DE)

( * ) Notice: Subject to any disclaimer, the term of this patent is extended or adjusted under 35 U.S.C. 154(b) by 0 days.

(21) Appl. No.: 16/336,941

(22) PCT Filed: Nov. 7, 2017

(86) PCT No.: PCT/DE2017/100946
§ 371 (c)(1),
(2) Date: Mar. 27, 2019

(87) PCT Pub. No.: WO2018/091031
PCT Pub. Date: May 24, 2018

(65) Prior Publication Data
US 2019/0264749 A1 Aug. 29, 2019

(30) Foreign Application Priority Data
Nov. 18, 2016 (DE) .................. 10 2016 222 772

(51) Int. Cl.
*F01L 1/34* (2006.01)
*F16D 3/26* (2006.01)
*F16D 3/04* (2006.01)
*F16H 49/00* (2006.01)

(52) U.S. Cl.
CPC ................. *F16D 3/26* (2013.01); *F16D 3/04* (2013.01); *F16H 49/001* (2013.01)

(58) Field of Classification Search
CPC ............. F16D 3/26; F16D 3/04; F16H 49/001
See application file for complete search history.

(56) References Cited

U.S. PATENT DOCUMENTS

| 1,769,107 A | 7/1930 | Brown |
| 4,696,658 A | 9/1987 | Senda |
| 8,187,106 B2 * | 5/2012 | Muenich ............... F02D 9/1065 |
| | | 464/105 |

(Continued)

FOREIGN PATENT DOCUMENTS

| DE | 19857248 C2 | 6/2000 |
| DE | 19909931 A1 | 9/2000 |
| DE | 102007049072 A1 | 4/2009 |

(Continued)

*Primary Examiner* — Zelalem Eshete
(74) *Attorney, Agent, or Firm* — Matthew Evans

(57) ABSTRACT

The invention relates to a compensating coupling comprising a coupling element arranged between a first machine element and a second machine element as a torque-transmitting component. The coupling element has an annular body and on each of the end faces of which a coupling section for torque-transmitting interaction with one of the machine parts is formed, wherein each coupling section has two coupling surfaces parallel to each other. All coupling surfaces of both coupling sections are parallel to each other, and at least one of the coupling sections is designed as a pair of lugs.

20 Claims, 4 Drawing Sheets

(56) References Cited

U.S. PATENT DOCUMENTS

| | | | |
|---|---|---|---|
| 8,220,426 B2 | 7/2012 | Uehama | |
| 2015/0033906 A1* | 2/2015 | Kimus | ................. F16H 35/008 74/568 R |

FOREIGN PATENT DOCUMENTS

| | | |
|---|---|---|
| DE | 102007051475 A1 | 4/2009 |
| DE | 102014210361 A1 | 12/2015 |
| DE | 102014219364 A1 | 3/2016 |
| EP | 2076682 A1 | 7/2009 |
| FR | 2559846 A1 | 8/1985 |
| JP | 2005083443 A | 3/2005 |

* cited by examiner

COMPENSATING COUPLING

CROSS-REFERENCE TO RELATED APPLICATIONS

This application is the U.S. National Phase of PCT Application No. PCT/DE2017/100946 filed Nov. 7, 2017 which claims priority to DE102016222772.6 filed Nov. 18, 2016, the entire disclosures of which are incorporated herein.

TECHNICAL FIELD

This disclosure relates to a compensating coupling provided for the purpose of compensating parallel misalignment between rotating components.

SUMMARY

A compensating coupling of this kind is known from DE 198 57 248 C2, for example. This is an Oldham coupling for connecting two shaft ends by means of an Oldham coupling disk using a tongue and groove system, wherein radial grooves are formed in the faces of the Oldham coupling disk. The radial grooves form coupling surfaces, which allow the transmission of a torque and, at the same time, permit an axial offset between the Oldham coupling disk and the shaft.

DE 199 09 931 A1 discloses a coupling for connecting two shaft ends capable of rotary movement, wherein a coupling element is connected positively and, at the same time, in an articulated manner to both shaft ends. The coupling element has two pins, which are connected firmly to each other, are arranged parallel to each other and which each engage in one shaft end.

Compensating couplings in the form of Oldham couplings can be used, inter alia, in electric camshaft adjusters. Attention is drawn by way of example in this context to documents DE 10 2007 051 475 A1 and DE 10 2007 049 072 A1. In the latter case, an Oldham coupling disk of the compensating coupling is manufactured from plastic. A twin-blade drive element, which is firmly connected to an output shaft of an actuator, engages in the Oldham coupling disk.

It is the underlying object of this disclosure to indicate a compensating coupling which has been enhanced relative to the prior art, especially in respect of manufacturing aspects and in respect of installation space requirements and moments of inertia, and is suitable for use in an electrically operated actuating device.

According to this disclosure, this object is achieved by a compensating coupling having the features described herein. The compensating coupling comprises a compensating element, which acts as a torque-transmitting component between a first machine element and a second machine element. The machine elements that can be coupled to one another by means of the compensating coupling can be any rotating elements, e.g. shafts, disks or rings. The compensating element has an annular body, which is of pot-shaped configuration, for example. Here, the term "annular body" does not necessarily imply that this is an element with a circular cross section. On the contrary, other configurations of the annular body, e.g. oval or angular, in particular polygonal, configurations are also possible.

In any case, a coupling section provided for torque-transmitting interaction with one of the rotatable machine parts is formed on each of the two faces of the annular body. Each of these coupling sections has two mutually parallel coupling surfaces, wherein all four coupling surfaces are parallel to each other and at least one coupling section is designed as a pair of lugs.

The term "coupling surfaces" does not necessarily imply that a torque-transmitting component rests against these surfaces and transmits a force. The crucial factor is that each coupling section as a whole has a torque-transmitting function. Here, force can be introduced into the coupling section via apertures situated in the coupling surfaces or via narrow sides of the coupling sections which define the coupling surfaces, for example.

According to one embodiment, the coupling surfaces of the various coupling sections are at different distances from the central axis of the annular body and hence that of the entire compensating coupling. If only one of the coupling sections is designed as a pair of lugs, the coupling surfaces of the pair of lugs can be further away from the central axis of the annular body than the coupling surfaces of the other coupling section. By virtue of the different lever arm lengths by means of which a torque is transmitted between the compensating element and the various machine elements, the machine elements which are coupled to each other by the compensating coupling are subjected to mechanical loads in different ways. This promotes a design of the compensating coupling which is appropriate to the stresses involved and is matched to the configuration of the machine elements.

According to one possible embodiment, the coupling surfaces of both coupling sections are designed as pairs of lugs. In this case, a pin can be inserted through the coupling surfaces and through a section of the first machine element, namely of a shaft, which is arranged between the coupling surfaces, said pin establishing an articulated connection between the shaft and the compensating element. Here, holes in the pair of lugs and in the circumferential surface of the pin provide surfaces which can be used to transmit a torque between the machine elements. The pin transmits the torque directly to the shaft provided as the first machine element, which can be a motor shaft of an electric motor.

Rather than with the aid of a single pin which is passed through the two lugs of the first coupling section and through the shaft, i.e. the first machine element, an articulated coupling between the first machine element and the compensating element that is simultaneously suitable for transmitting a torque can also be produced in some other way. For example, contours, in the form of raised portions, depressions or recesses for example, which are formed directly by the two lugs of the first pair of lugs, can interact directly with mating contours formed by the first machine element. In all cases, the angular range within in which the compensating element can be tilted relative to the first machine element can be limited by stops. Stops of this kind, which form a tilt angle limiter, can be formed, for example, by the engagement of a section of the first machine element with play in a central aperture in the compensating element. In this case, the coupling surfaces, which, in particular, are formed by a pair of lugs are situated radially to the outside of the central aperture in the compensating element.

If only one of the two coupling sections is designed as a pair of lugs, the other coupling section can be formed by a collar, which forms the border of an elongate hole. In this arrangement, an end section of one of the machine elements engages in the elongate hole. Through the interaction of the machine element with the elongate hole, an articulated connection can be formed between the machine element and the compensating element without an additional element, e.g. in the form of a pin or separate bearing elements.

The coupling section which is situated on that face of the compensating element which faces away from the articulated connection to one of the machine elements, in particular a shaft, implemented with the aid of a pin or of an elongate hole, can be of spherical design. In a side view, this coupling section defines a lobe shape. If the coupling section is designed as a pair of lugs, both lugs have the same lobe shape, wherein the feet of the lobe-shaped lugs are each connected in a fixed manner to the annular body. The lobe-shaped coupling surfaces ensure that the corresponding coupling section can be tilted to a significant extent relative to the connected machine element, wherein the lobe-shaped lugs engage in apertures in the machine element. In this way, the compensating element can be coupled with little play in the circumferential direction to the machine element in which the lobe-shaped lugs engage. At the same time, the apertures in the machine element can be configured in such a way that the lobe-shaped lugs and, together therewith, the entire compensating element can be moved to a significant extent in the radial direction of the machine element. In summary, this means that the lobe-shaped coupling surfaces are guided with greater play in the radial direction than in the tangential direction in the machine part. In addition to the tiltability of the compensating element, an additional geometric degree of freedom is provided thereby within the compensating coupling.

The compensating element can be produced efficiently as an integral sheet-metal part.

To increase wear resistance, the compensating element can be surface-hardened, e.g. carbonitrided. Torque spikes can be smoothed out by means of elastic flexibility of the entire compensating element. Here, the lobe-shaped lugs of the second pair of lugs, in particular, can act as spring elements.

The machine element in which the lobe-shaped lugs engage is an inner ring of a wave generator of a strain wave gear, for example. Here, the inner ring can be designed as the inner ring of a rolling bearing or as the inner ring of a sliding bearing. In both cases, the inner ring has a noncircular outer contour, which deforms a flexible transmission element during the operation of the strain wave gear.

The advantage of this disclosure resides especially in that there is no need to secure a separate drive element, e.g. a twin-blade drive element, on a driving first machine element in order to drive the compensating element. On the contrary, the compensating element of the compensating coupling is coupled in a torque-transmitting manner to the first machine element either without an intermediate element or with an intermediate element of the simplest design, namely a pin, wherein the tiltability of the compensating element relative to the machine element is enough to compensate for parallel misalignment in a first direction. Parallel misalignment in a second direction orthogonal thereto can be produced not only by the ability of the second coupling section to move relative to the second machine element, as already explained, but can also additionally or alternatively be produced by the ability of the compensating element to move on the pin or a similar coupling element. Elastic properties both of the compensating element and of at least one of the machine elements can likewise be used to produce the desired compensating function. In all cases, not only parallel misalignment but also angular misalignment between the rotation axes of the machine elements can be compensated by the compensating coupling. While being of simple design, the compensating coupling is distinguished by low moments of inertia and a simple, easy-to-assemble construction.

The compensating coupling can be used to drive an adjusting shaft of an actuating mechanism, for example. The actuating mechanism is, for example, a mechanism of an electric camshaft adjuster or an actuating mechanism of a device for varying the compression ratio of a reciprocating-piston machine, in particular a reciprocating-piston engine. In the latter case, the actuating mechanism is used to adjust an eccentric shaft coupled via a secondary connecting rod to further components of a crank mechanism.

BRIEF DESCRIPTION OF THE DRAWINGS

Several illustrative embodiments of the disclosure are described in greater detail below with reference to a drawing, in which.

DETAILED DESCRIPTION

Figure 1:
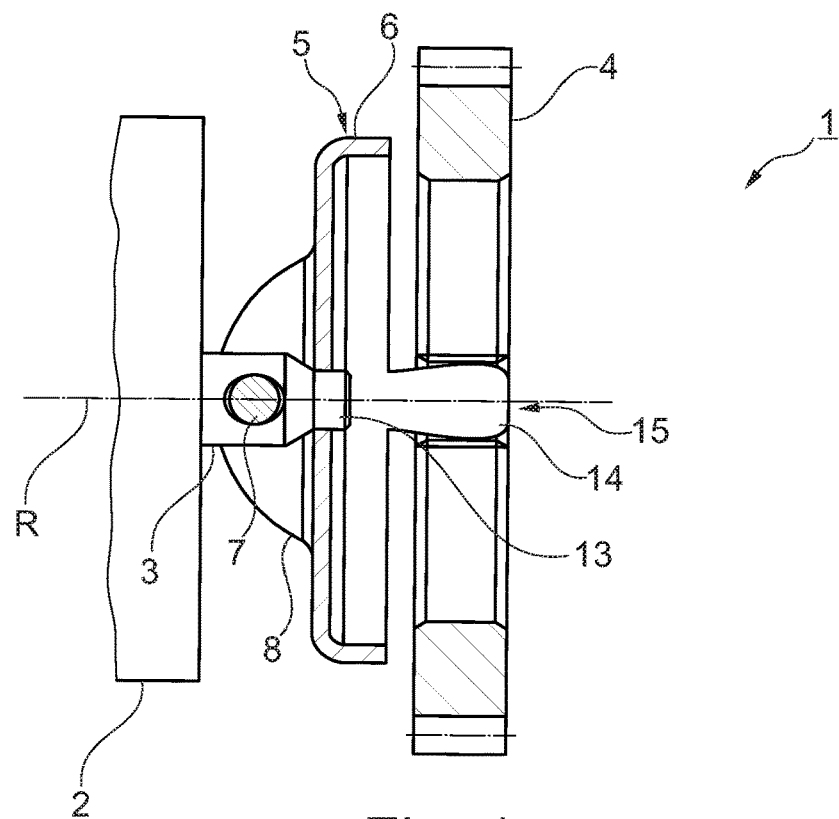
FIG. 1 shows a compensating coupling without parallel and angular misalignment in section.

Unless otherwise stated, the following explanations apply to all the illustrative embodiments. Parts which correspond to one another or have the same action in principle are denoted by the same reference signs in all the figures.

An actuating device denoted overall by the reference sign 1 is an electric camshaft adjuster. The rotation axis, denoted by R, of the actuating device 1 is identical with the rotation axis of the camshaft (not shown) of an internal combustion engine. In respect of the basic functioning of the actuating device 1, attention is drawn to the prior art cited at the outset.

An electric motor 2 has a motor shaft, designated in general as shaft 3, which forms one component of a compensating coupling 5 which is explained in greater detail below. In general, the shaft 3 is referred to as the first machine element. The compensating coupling 5 is provided for the purpose of compensating parallel misalignment and/or angular misalignment between the first machine element 3 and a second machine element 4. The second machine element 4 is an inner ring of a wave generator of the actuating device 1. The inner ring 4 has a noncircular outer contour and interacts in a manner known per se with a flexible transmission element within a strain wave gear.

The central element of the compensating coupling 5 is a coupling element 6, which is coupled to the shaft 3 with the aid of a pin 7 (FIGS. 1 to 6) or without any intermediate element (FIG. 7, 8) in a manner which allows limited tilting. A first pair of lugs 8 (FIGS. 1 to 6) or a collar 19, which defines an elongate hole 20 (FIG. 7), provides a first coupling section of the coupling element 6. The first coupling section 8, 19 has mutually parallel coupling surfaces, which are provided by the two lugs of the pair of lugs 8 or by the longitudinal sides of the collar 19, which define the elongate hole 20. In both cases, the first coupling section 8, 19 adjoins a flat annular body 11 of the coupling element 6.

Adjoining the annular body 11 on the opposite front face of said body from the first coupling section 8, 19 is a second coupling section 14, designed as a pair of lugs. Irrespective of the configuration of the first coupling section 8, 19, the second coupling section 14 is referred to as the second pair of lugs. The two lugs of the second pair of lugs 14 are formed integrally on the rim of the annular body 11 and, like the first coupling section 8, 19, extend in the axial direction of the coupling element 6. In side view (FIG. 1, FIG. 8), the second pair of lugs 14 has a lobe shape and forms two mutually parallel coupling surfaces, in a manner similar in principle to the first coupling section 8, 19.

Figure 7:
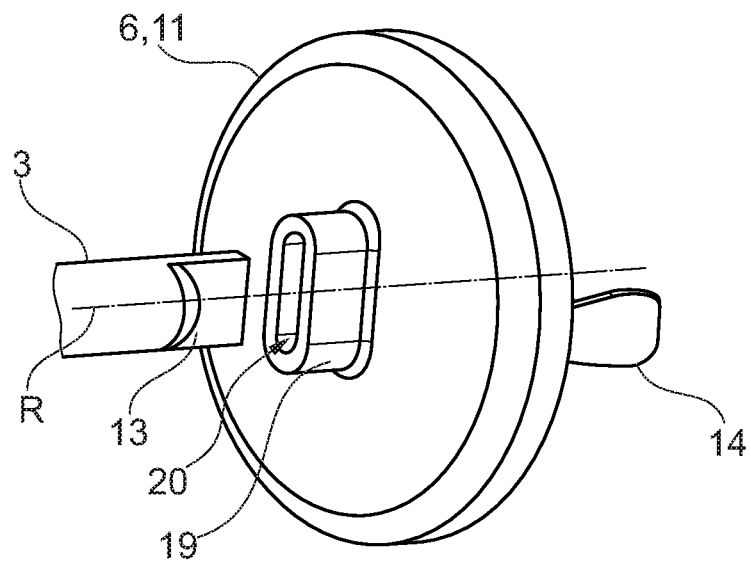
FIG. 7 shows components of an alternative compensating coupling in an exploded illustration, and, FIG. 8 shows a longitudinal section through a compensating coupling modified as compared with FIG. 7.
Figure 8:
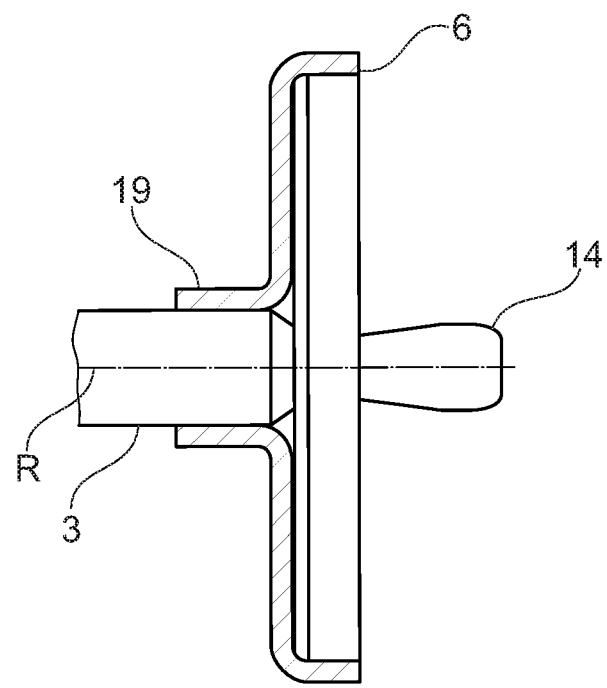

All the coupling surfaces of the first coupling section 8, 19 and of the second coupling section 14 are aligned parallel to each other. The coupling surfaces of the second coupling section 14 are significantly further away from the rotation axis R than the coupling surfaces of the first coupling section 8, 19. Overall, the coupling element 6 has substantially a pot shape which is open toward the second coupling section 14. In the case of FIGS. 7 and 8, the pot end surface of the annular body 11 is closed, with the exception of the collar 19, whereas, in the design according to FIGS. 1 to 6, the end surface of the annular body 11 is penetrated to a greater extent. A web 9, which forms the end surface of the annular body 11, is shown, in particular, in FIG. 4, wherein there is a central aperture 10 in the middle of the web 9. The first pair of lugs 8, which acts as a first coupling section, is folded out of the end surface of the annular body 11 and has two mutually aligned holes 12.

Figure 2:
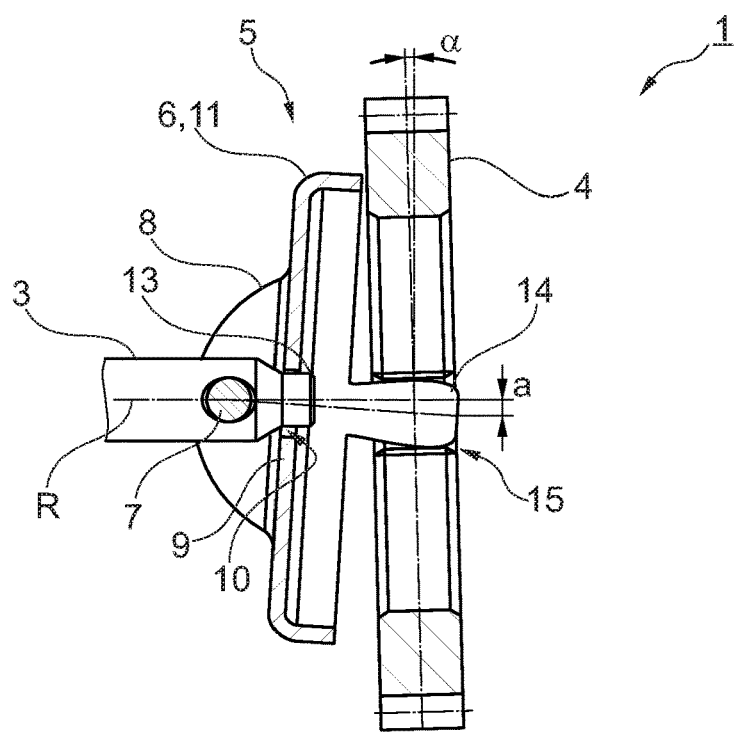
FIG. 2 shows the compensating coupling with parallel and angular misalignment, illustrated in a first angular position, in an illustration similar to FIG. 1.
Figure 3:
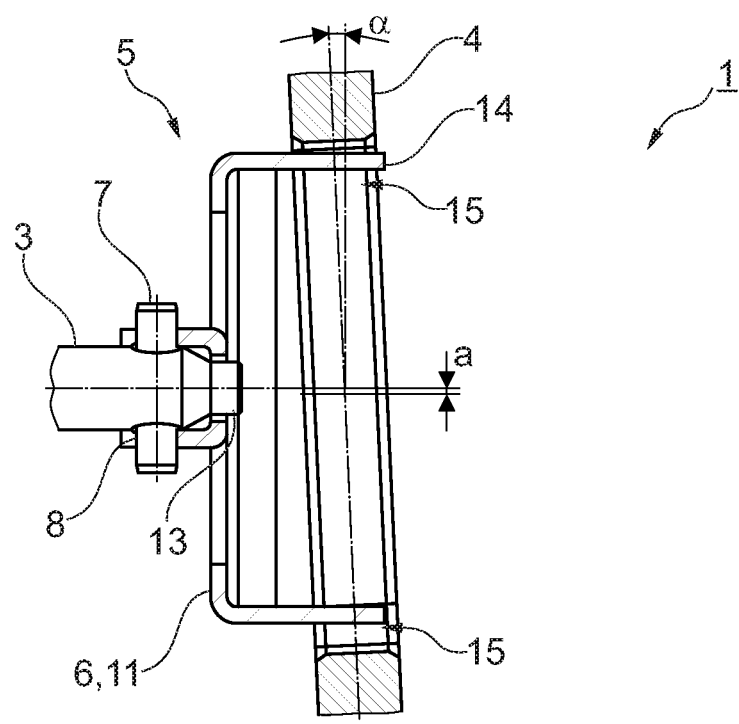
FIG. 3 shows the arrangement according to FIG. 2 in a second angular position, perpendicularly to the position illustrated in FIG. 2.
Figure 4:
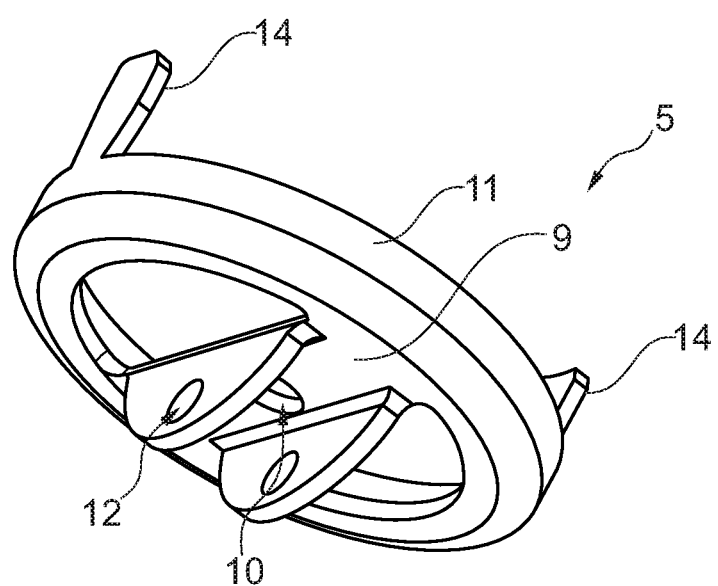
FIG. 4 shows a compensating element of the compensating coupling according to FIG. 1 in a perspective illustration.
Figure 5:
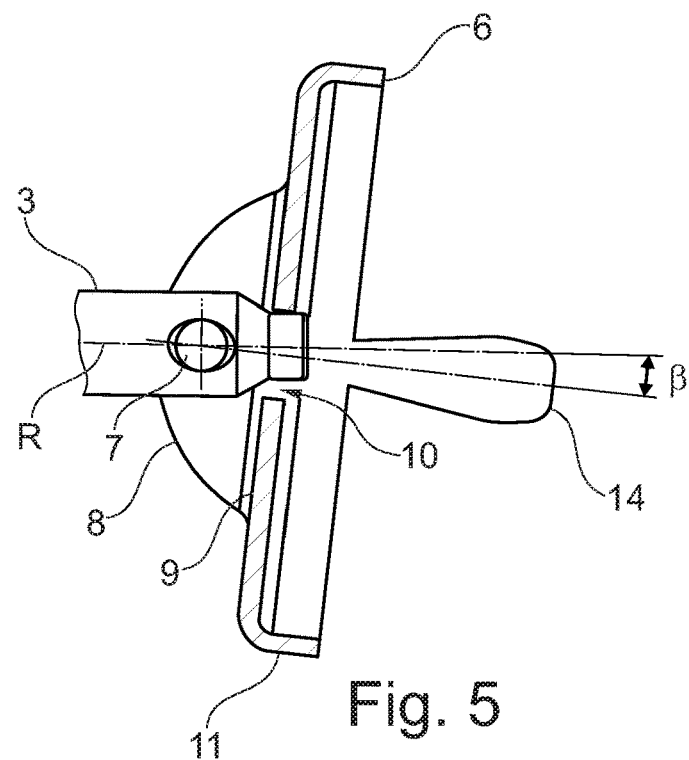
FIG. 5 shows the compensating element in an uncoupled state.

The pin 7 is passed through the holes 12 in the coupling element 6 according to FIGS. 1 to 6, said pin penetrating the shaft 3 and establishing the articulated connection between the coupling element 6 and the shaft 3. A tapered extension, denoted by 13, of the shaft 3 engages with play in the central aperture 10 in the coupling element 6, limiting the tilting of the latter relative to the shaft 3. Parallel misalignment between the machine elements 3, 4 is denoted by a in FIG. 2. In FIG. 5, β denotes the maximum angle through which the coupling element 6 can tilt relative to the shaft 3 when the compensating coupling 5 is not in engagement. The angle denoted by α in FIGS. 2 and 3 represents an angular misalignment between the central axis of the inner ring 4 and the rotation axis R of the shaft 3. The angle β is chosen so that it is greater than the maximum tilting specified by the angle α in the coupled state of the compensating coupling 5. On the other hand, the angle β chosen is sufficiently small to allow simple pre-positioning for the assembly of the actuating device 1.

In the case of FIG. 7, the tapered extension 13 of the shaft 3 is designed as a flattened end section of the shaft 3, i.e. as a dihedron, which makes direct contact with the walls on the long sides of the elongate hole 20, which act as contact surfaces. As can be seen from FIG. 7, a limited tiltability of the coupling element 6 relative to the shaft 3 is provided in a defined direction by play of the tapered extension 13 within the elongate hole 20. As a departure from this, it is also possible to press-fit the collar 19 onto the shaft 3, giving rise to the arrangement shown in FIG. 8. In this case, significant displacements of the coupling element 6 are provided by the elastic properties of the shaft 3 or of other components of the actuating device 1.

In order to ensure the tiltability of the second pair of lugs 14 relative to the second machine element 4 irrespective of the configuration of the first coupling section 8, 19, the two lugs of the second pair of lugs 14, i.e. the coupling surfaces of the second coupling section 14, each have an enlarged, rounded end, this resulting overall in the lobe shape of the second coupling section 14. In the circumferential direction of the second machine element 4, the second lobe-shaped pair of lugs 14 is guided with little play, as can be seen in FIGS. 1 and 2. In contrast, a significant offset between the coupling element 6 and the second machine element 4 is possible in a direction orthogonal with respect thereto (FIG. 3, FIG. 6), which, in addition to accommodating angular misalignment, as illustrated in FIG. 3, also allows parallel misalignment in the corresponding plane. This is the plane in which the tilting axis of the coupling element 6 relative to the shaft 3 is also situated. This applies both to the designs shown in FIGS. 7 and 8 and to the illustrative embodiment shown in FIGS. 1 to 6.

Figure 6:
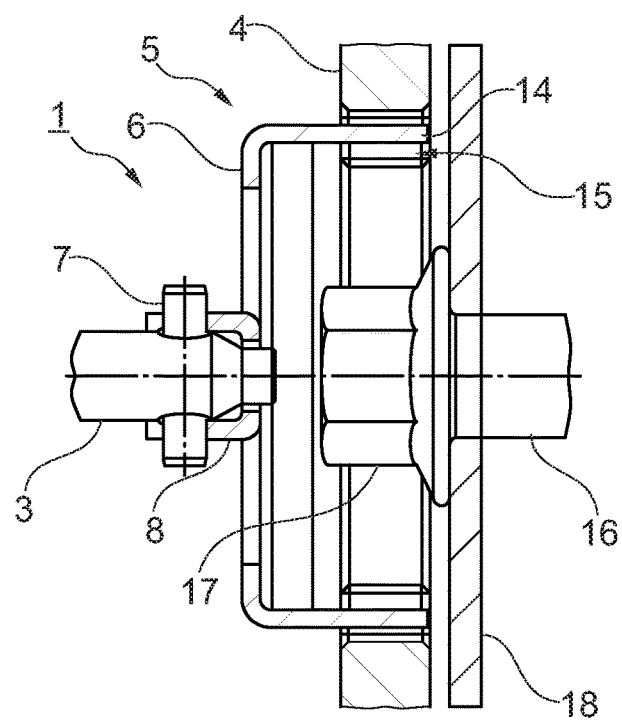
FIG. 6 shows the compensating coupling and machine elements interacting with the compensating coupling in a space-saving arrangement.

FIG. 6 shows a central screw 16, which is aligned coaxially with the shaft 3 and the head 17 of which rests against a component 18, which is connected, as an output element of the actuating device 1, for conjoint rotation to the camshaft (not shown). As is apparent from FIG. 6, the head 17 of the central screw 16 is arranged in a space-saving manner centrally within the second coupling section 14, i.e. between the lugs forming the second pair of lugs 14. This likewise applies to the designs shown in FIGS. 7 and 8. In all cases, the coupling element 6 is an integral component, produced without machining, of the compensating coupling 5.

LIST OF REFERENCE CHARACTERS 1 actuating device
2 electric motor
3 shaft, first machine element
4 inner ring, second machine element
5 compensating coupling
6 compensating element
7 pin
8 first coupling section, first pair of lugs
9 web
10 central aperture in the web
11 annular body
12 holes in the first pair of lugs
13 tapered extension of the shaft
14 second coupling section, second pair of lugs
15 aperture in the inner ring
16 central screw
17 head
18 component
19 collar, first coupling section
20 elongate hole
α, β angle
a parallel misalignment
R rotation axis

The invention claimed is:

1. A compensating coupling having a coupling element configured to be arranged between a first machine element and a second machine element as a torque-transmitting component, the coupling element comprising an annular body with a first face and a second face, the first face forming a first coupling section and the second face forming a second coupling section, the first or second coupling sections configured for torque-transmitting interaction with one of the first or second machine elements, each coupling section having two coupling surfaces parallel to each other, and the first coupling section formed as a pair of lugs configured as an articulated connection with the first or second machine element.

2. The compensating coupling as claimed in claim 1, wherein the coupling surfaces of the first coupling section are at a different distance from a central axis of the annular body than the coupling surfaces of the second coupling section.

3. The compensating coupling as claimed in claim 1, wherein the coupling surfaces of both coupling sections are formed as pairs of lugs.

4. The compensating coupling as claimed in claim 1, further comprising a pin, the pin inserted through the coupling surfaces of the first coupling section, the pin configured to extend through a section of the first machine element arranged between the coupling surfaces, the pin establishing the articulated connection between the first machine element and the coupling element.

5. The compensating coupling as claimed in claim 1, further comprising a central aperture in the coupling element, the central aperture configured to form a tilt angle limiter for a tapered extension of the first machine element that engages the central aperture with play.

6. The compensating coupling as claimed in claim 1, wherein the coupling surfaces of the second coupling section define a lobe shape.

7. The compensating coupling as claimed in claim 6, wherein the coupling element is guided with a greater play in a radial direction than in a tangential direction in the second machine element by the lobe-shaped coupling surfaces of the second coupling section.

8. The compensating coupling as claimed in claim 1, wherein the coupling element is configured as an integral sheet-metal part.

9. The compensating coupling as claimed in claim 1, wherein the second machine element is an inner ring of a wave generator of a strain wave gear.

10. The compensating coupling as claimed in claim 1, wherein the first machine element is a shaft of an electric motor.

11. A compensating coupling configured as a torque-transmitting component, the compensating coupling comprising a coupling element arranged between a first rotating component and a second rotating component, the coupling element having an annular body and a hole configured to be engaged by the first rotating component, a first side of the annular body defining a first coupling section having at least two first coupling surfaces, and a second side of the annular body defining a second coupling section having at least two second coupling surfaces, the at least two second coupling surfaces parallel to the at least two first coupling surfaces; and, at least one of the first or second coupling sections formed as a pair of lobe-shaped lugs configured for torque-transmitting interaction with one of the first or second rotating components.

12. The compensating coupling of claim 11, wherein the compensating coupling is configured to compensate for parallel misalignment and angular misalignment between the first and second rotating component.

13. The compensating coupling of claim 11, wherein the at least two first coupling surfaces of the first coupling section are at a different distance from a central axis of the annular body than the at least two second coupling surfaces of the second coupling section.

14. The compensating coupling of claim 11, wherein the hole is configured to form a tilt angle limiter for the first rotating component that engages the hole with play.

15. The compensating coupling of claim 11, wherein the coupling element is press-fit onto the first rotating component, and elastic properties of the first rotating component compensate for at least one of parallel misalignment or angular misalignment between the first and second rotating component.

16. The compensating coupling of claim 11, wherein the second coupling section is configured to surround at least a portion of a fastener configured to connect the second rotating component with a third rotating component.

17. A compensating coupling having a coupling element configured to be arranged between a first machine element and a second machine element as a torque-transmitting component, the coupling element comprising an annular body with a first face and a second face, the first face forming a first coupling section and the second face forming a second coupling section, the first and second coupling sections configured for torque-transmitting interaction with the first and second machine elements, each coupling section having two coupling surfaces parallel to each other, and the first coupling section including two coupling surfaces that form a collar configured as a border of an elongate hole.

18. The compensating coupling of claim 17, wherein at least a portion of the two coupling surfaces are configured to receive the first machine element.

19. The compensating coupling of claim 17, wherein the collar is configured to receive a flattened end section of the first machine element with play.

20. The compensating coupling of claim 17, wherein the second coupling section is formed as a pair of lobe-shaped lugs, each lug configured for torque-transmitting interaction with the first or second machine element, and the pair of lobed-shaped lugs configured to allow tilting of the coupling element relative to the second machine element.

* * * * *